United States Patent [19]
Carey

[11] 3,951,626
[45] Apr. 20, 1976

[54] HIGH TEMPERATURE FILTER
[75] Inventor: Colwell Carey, Glen Rock, N.J.
[73] Assignee: Kreisler Manufacturing Corporation, North Bergen, N.J.
[22] Filed: Oct. 4, 1974
[21] Appl. No.: 512,173

[52] U.S. Cl.................................. 55/278; 55/480;
 55/509; 55/511; 55/529; 55/DIG. 30;
 55/DIG. 31; 60/280; 60/311; 60/322; 92/78
[51] Int. Cl.²......................................... B01D 46/60
[58] Field of Search ............. 55/278, 478, 480, 498,
 55/503, 507, 509, 511, 529, DIG. 30, DIG.
 31; 60/280, 311, 322; 52/573; 92/78; 165/81

[56] References Cited
UNITED STATES PATENTS

| | | | |
|---|---|---|---|
| 2,466,307 | 4/1949 | Di Renna | 55/DIG. 30 |
| 2,772,537 | 12/1956 | Lisciani | 60/311 X |
| 2,962,131 | 11/1960 | Rossi | 52/573 |
| 3,248,188 | 4/1966 | Chute | 55/DIG. 30 |

FOREIGN PATENTS OR APPLICATIONS

| | | | |
|---|---|---|---|
| 129,574 | 1/1929 | Switzerland | 55/278 |
| 393,022 | 12/1908 | France | 55/278 |

*Primary Examiner*—Frank W. Lutter
*Assistant Examiner*—Kathleen J. Prunner
*Attorney, Agent, or Firm*—H. Hume Mathews; J. Llewellyn Mathews

[57] ABSTRACT

A new filter structure is provided for removing particles from the exhaust gas of a large, single piston engine of low RPM, before passing the exhaust gas through a turbine for the purpose of driving a supercharger. The filter is so constructed as to be able to efficiently and reliably perform its filtering function over long periods of time in the high temperature environment of the piston engine exhaust. It comprises a cylindrical shaped housing having at one end longitudinally extending slits distributed around its circumference and at the other end an annular flange for mounting the filter in the exhaust line. The housing encloses a filter element comprising a hexagonal stacked array of cylindrical tubes and said filter element is retained in said housing by means of multiple resilient brackets, each formed in the shape of an open elongated loop so as to conform generally to the contour of the filter element on one hand and the inside of the housing on the other. Some of the slits in the housing align with the open ends of the brackets and the remaining slits are positioned between the brackets. The flexibility inherent in the shape of the brackets, combined with the flexibility provided by the cooperation of the slits in the housing with the open portions of the brackets, results in excellent capability for expansion, due to high temperatures, in the plane of the filter element. The entire assembly is preferably furnace brazed.

6 Claims, 8 Drawing Figures

HIGH TEMPERATURE FILTER

BACKGROUND OF THE INVENTION

1. Field of the Invention

The problem which the present invention specifically is intended to solve is in present installations of oil and/or gas well pumps.

A typical oil or gas well pump is self-propelled in the sense that the fluid which is being pumped is also burned in the internal combustion engine which drives the pump. The engine is generally of the reciprocating type, and comprises a single, large cylinder which drives the pump at very low RPM through a large flywheel. To promote efficient operation, the exhaust gas from the reciprocating engine is ordinarily expanded through a turbine which in turn drives a compressor for the purpose of supplying supercharging air to the pump engine. Before the exhaust gases pass to the turbine, large particles (generally in excess of 0.50 inch) are removed by passing the gas through a filter. It is this filter which is the subject of the present invention.

2. Description of the Prior Art

Since oil or gas pumps frequently must operate in isolated locations, without human attention, and almost always on a twenty-four hour basis, reliability is extremely important. In the prior art, the filter element in the stream of exhaust gases from the pump engine suffered from an undesirably high rate of failure. This was caused both by high temperatures (upwards of 1400°F.) and by fluctuating temperatures from the alternating presence and absence of exhaust gas flow through the filter.

In the prior art filter design which the present invention replaces, the filter element was located at the flange end of of the housing (see FIG. 7) and the filter element comprised a corrugated, spirally wound assembly. This arrangement was poor from an expansion standpoint and at high temperatures distortion of the filter element would occur along the axis of the cylindrical housing, i.e., — bulging.

Specifically in the prior art, the spiral design of the filter element and the location of the filter element interiorly of the mounting flange, severely inhibited normal expansion of the filter element in the radial direction with variations in temperature. Since the filter element could not expand sufficiently in a radial direction, bulging would occur in a longitudinal direction. The stresses caused by the inhibited radial expansion and resultant bulging would often lead to cracking and premature failure of the filter element or housing.

The filter of the present invention is so constructed and arranged as to overcome this bulging problem by allowing virtually free radial expansion of the filter element and to provide an extremely reliable long lasting filter which will function efficiently, without maintenance or attention of any kind, in unattended oil or gas well pump installations.

SUMMARY OF THE INVENTION

This invention is a filter specifically designed for fluctuating high temperature applications where wide temperature variations, with resultant expansion and contraction, are important factors. The filter assembly comprises a filter element, a multiple of resilient brackets and an outer housing having a mounting flange and partially slit sides.

The filter element in the preferred embodiment is a hexagonal stacked array of cylindrical or tubular members. The brackets are preferably formed into an open loop to fit the contour of the filter element on one side and the inside wall of the housing on the other. The housing is provided with a multiple of slits spaced around its circumference and extending in the wall of the housing from one end parallel to the cylindrical axis. The number and spacing of the slits in the housing is preferably chosen so every other slit aligns with the center of a bracket and the remaining slits are positioned between the brackets. The open portion of each bracket aligns with the corresponding slit in the housing and the two cooperate with each other and with the resiliency of the bracket to provide the flexibility necessary to allow heat expansion, without bulging, of the filter element.

The entire assembly is preferably furnace brazed.

Accordingly, it is an object of the present invention to provide a filter assembly of improved design which will withstand fluctuating and substantial temperature expansion and contraction over an extended lifetime.

It is a further object of the invention to provide a filter assembly that may be cheaply and easily manufactured, as compared with the prior art filter structures.

Other features and benefits of the invention will be evident to those skilled in the art from the following detailed description of a preferred embodiment.

DETAILED DESCRIPTION OF THE PREFERRED EMBODIMENT

Figure 1:
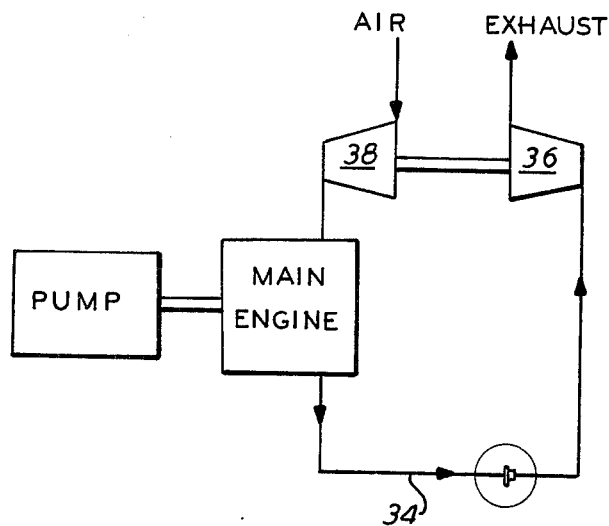
FIG. 1 is a schematic diagram of an oil/gas pump system into which a preferred embodiment of the filter of the present invention is intended to operate.

FIG. 1 shows schematically a typical installation of the filter of this invention in an oil and/or gas well pump. The main engine is typically a single large cylinder reciprocating engine which drives the pump through a large flywheel. The fuel burned in the main engine is usually the same substance which is being pumped, and it is frequently mixed with substantial amounts of foreign matter. The exhaust from the main engine passes out through line 34, to the filter assembly which is the subject of this invention, and then it is expanded through turbine 36. Turbine 36 conventionally drives compressor 38 which acts as a supercharger for the main engine.

Figure 1A:
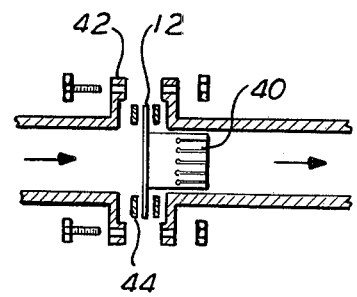
FIG. 1a is an exploded cutaway detail showing a typical installation of the preferred embodiment in the exhaust line of the pump.
Figure 2:
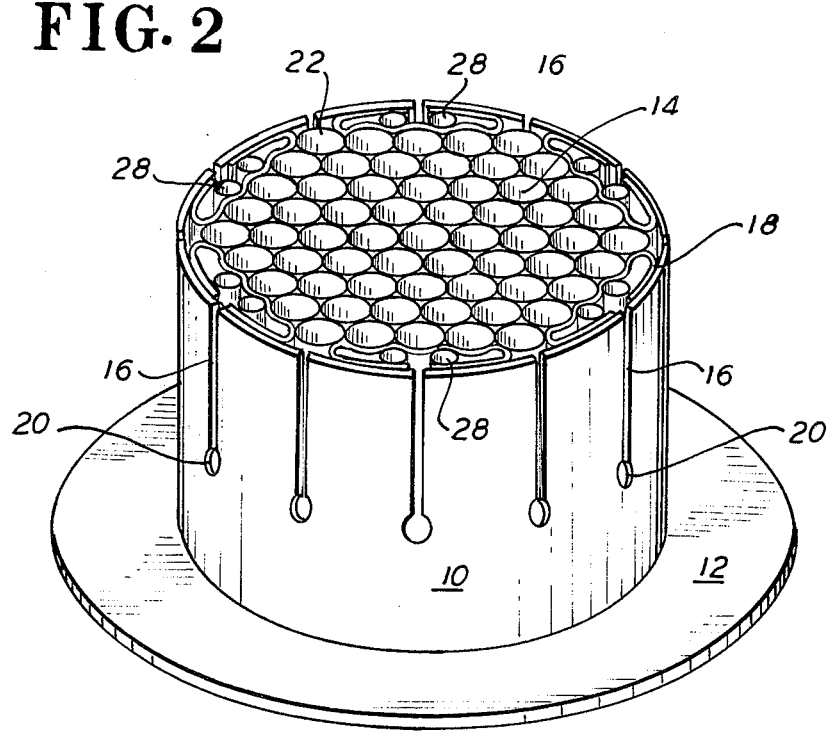
FIG. 2 is a perspective view of a preferred embodiment of the invention.

As shown in the detail of FIG. 1a, the filter assembly 40 may be mounted in the exhaust line 34 at a flanged joint. In this example the flange 12 of filter assembly 40 is held tightly between the flanges 42 of the exhaust line or conduit 34. Asbestos gaskets 44 on either side of flange 12 prevent leakage at the joint. It is preferred that flange 12 not be drilled to receive bolts or pins since this would tend to produce a weak spot where failure could occur from heat expansion.

Figure 5:
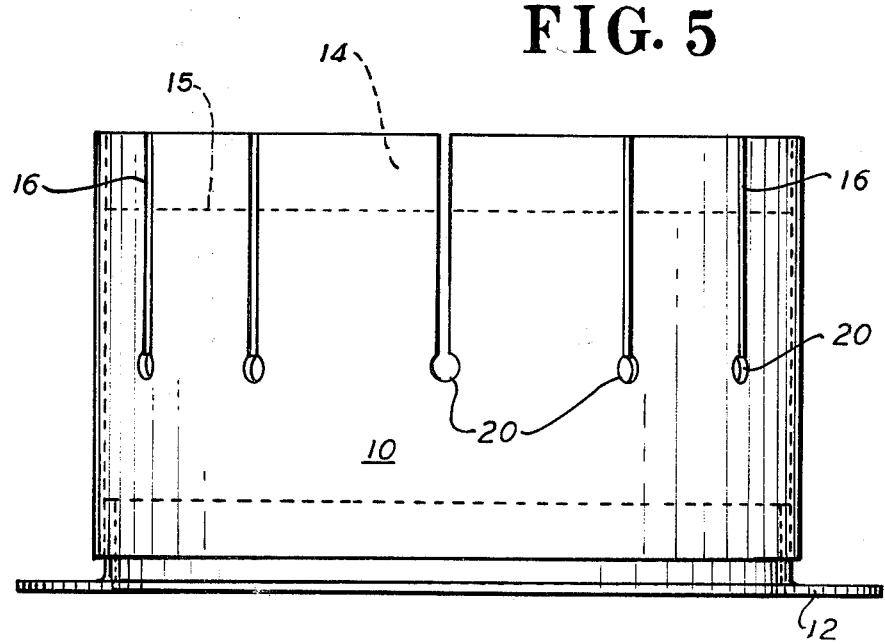
FIG. 5 is an elevational view of the preferred embodiment.

The filter assembly, as shown in FIGS. 2 through 6, is preferably cylindrical in overall shape, with an exterior open ended housing 10 for supporting the filter element shown generally at 14. The open ends of the housing function as an inlet and an outlet for flow of gas through the housing 10. The housing preferably includes means for securing the filter assembly within the gas stream such as a flange 12, which may be formed integrally with the housing 10 or formed separately and attached to the housing 10 as shown in FIG. 5. For convenience, the flanged end of the filter assembly will hereinafter be referred to as the "upstream end" and the opposite end will be referred to as the "downstream end". This terminology also reflects the preferably orientation of the filter assembly in the exhaust stream. The filter may be made of any material which can be furnace brazed, which will withstand the temperature of the exhaust gas, and which exhibits other desired or necessary characteristics stated in this specification.

In order to maximize the capability for expansion and contraction of the filter element 14, it is mounted at or near the end of the housing 10 opposite the flange 12. As explained previously, flange 12 tends to inhibit the expansion of filter element 14, so it is desirable to locate the filter element 14 as far as possible from the flange 12. Further, housing 10 is provided with a multiple of slits 16 extending from the downstream end of the housing and parallel to the cylindrical axis of the housing 10. The length of the slits 16 is approximately three times the length of the filter element 14 in the preferred embodiment, however, this length may be greater or smaller as may be convenient and appropriate in a particular application, subject only to the necessity of providing sufficient flexibility to the portions of housing 10 between slits 16. The preferred length and placement of filter element 14 with respect to the housing 10 and slits 16 may best be seen in FIG. 5 where the numeral 15 indicates the distance that filter element 14 extends longitudinally from the slit end of housing 10. The number of slits 16 around the periphery of the housing 10 will depend upon the number of brackets 18 used and the particular structure of the filter element 14. In the preferred embodiment illustrated in the drawings there are twelve (12) slits 16 equally spaced around the circumference of housing 10. Slits 16 preferably terminate at holes 20 in the body of housing 10 so as to minimize cracking of the housing 10 from flexure during heating or cooling. The slits 16 are preferably evenly spaced around housing 10 so as to equalize the forces and dimensional changes of temperature expansion and contraction.

The filter element 14 comprises a hexagonal stacked array of open ended cylindrical tubes 22. In the application of this invention to an oil and/or gas well pump the filter element 14 is required to catch particles in excess of 0.5 inch nominal diameter. Therefore, the tubes 22 in the preferred embodiment are 0.5 inch in inside diameter. The hexagonal stacked arrangement of tubes 22 is chosen for the preferred embodiment primarily for ease of manufacture and also for its predictable expansion characteristics. However, any convenient filter element or combination of elements may be used. At the time of final assembly, the tubes 22, and all other parts of the filter assembly are preferably joined together by furnace brazing.

Figure 3:
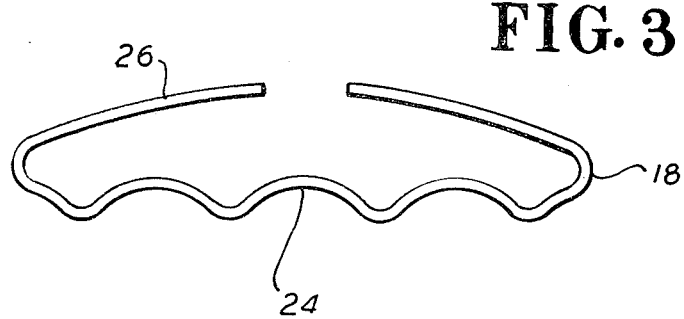
FIG. 3 is a detailed illustration of the preferred design for the resilient, open loop bracket of the invention.
Figure 6:
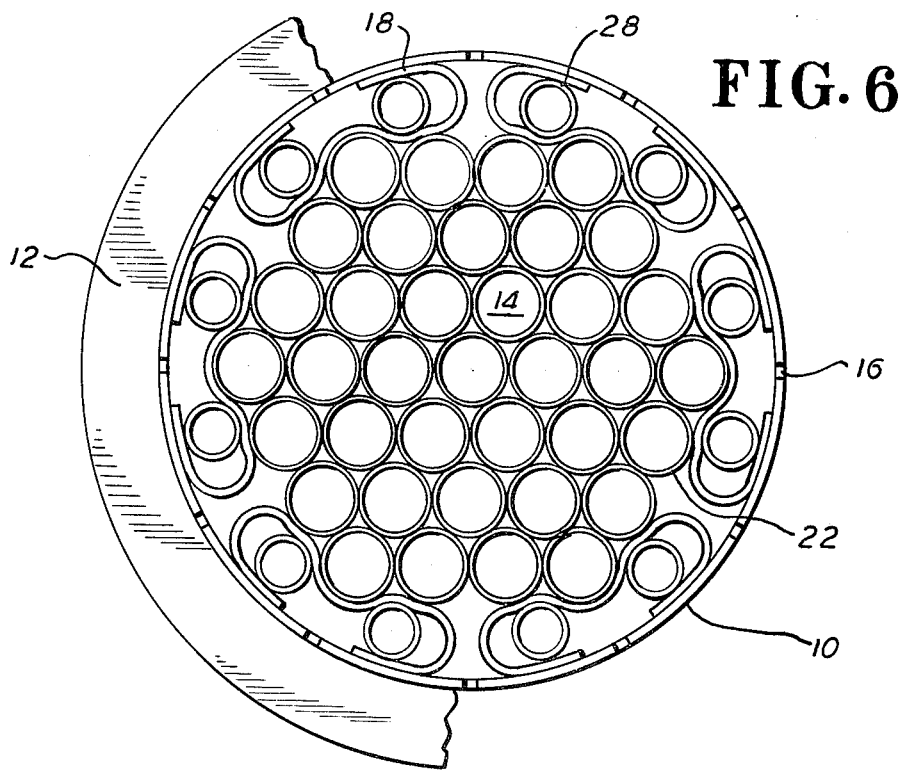
FIG. 6 is a plan view of another embodiment of the invention with the brackets positioned at the apexes of the hexagonal filter element.

Filter element 14 is retained in housing 10 by a multiple of resilient brackets 18 which have the dual purpose of securing the filter element 14 in the housing 10 and providing for the expansion and contraction of the filter element 14. The preferred form of bracket 18 is shown in FIG. 3. Generally it is a strip of material formed into a loop, contoured to fit the periphery of the filter element 14, on one side, as shown at 24, and the inside of the housing 10, on the other side, as shown at 26. The shape shown for bracket 18 is designed to fit the contour along the side of the hexagonal stacked array of filter element 14. However, brackets 18 may also be designed to be located at any other portion of the filter element 14, such as at the apexes, as shown in FIG. 6, or they may be designed to fit other types or shapes of filter elements. If the interior dimension of bracket 18 is large compared to the size of particles which are to be filtered, additional tubular inserts 28 may be placed inside of bracket 18.

The relationship between brackets 18 and slits 16 is of particular importance to this invention. In the preferred embodiment six brackets 18 are used to support the hexagonal filter element 14, and twelve slits 16 are equally spaced around housing 10. Preferably, every other slit 16 is aligned with the open portion of one of the brackets 18 and the remaining slits 16 align between brackets 18. In alternative embodiments either the set of slits 16 aligning with brackets 18, or the set of slits 16 aligning between brackets 18, may be omitted, thus leaving six slits 16 and six brackets 18. As stated previously, although symmetry in the spacing of slits 16 and brackets 18 is not absolutely necessary, it it highly desirable to provide equal forces and displacement during expansion and contraction, thus extending the life of the filter assembly. Also to increase flexibility, twelve slits 16 are preferred rather than six.

Regardless of the relative number of slits 16 and brackets 18, at any point where a slit 16 aligns with a bracket 18, the bracket 18 must be provided with a corresponding opening as shown in FIG. 3. For ease of manufacture, the brackets 18 are preferably bent into shape with the ends left open, however, the opening may be formed in any manner, as by cutting at the same time that slits 16 are machined after final assembly. The opening in bracket 18 is also preferably larger than the width of slit 16 to allow for manufacturing tolerances during assembly. Of utmost importance is that brackets 18 should not interfere with free movement of the housing 10, on either side of a slit 16.

As previously stated, the entire filter assembly is preferably furnace brazed. After final assembly, the flexibility inherent in the shape of the brakcets 18, combined with the flexibility provided by slits 16 in the housing 10 and the cooperating openings in brackets 18, result in excellent capability for expansion in the plane of the filter element 14.

Figure 7:
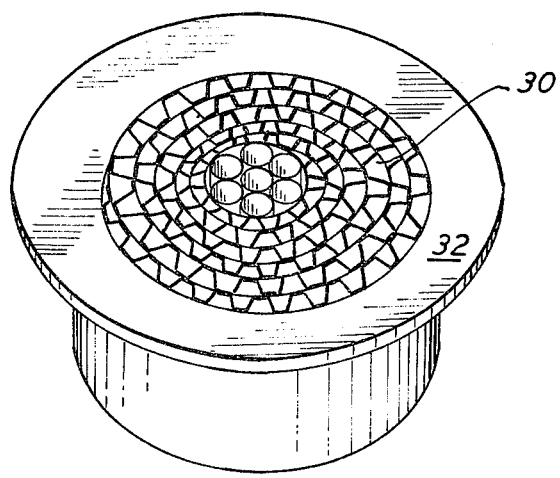
FIG. 7 is a perspective illustration of the prior art design.
Figure 4:
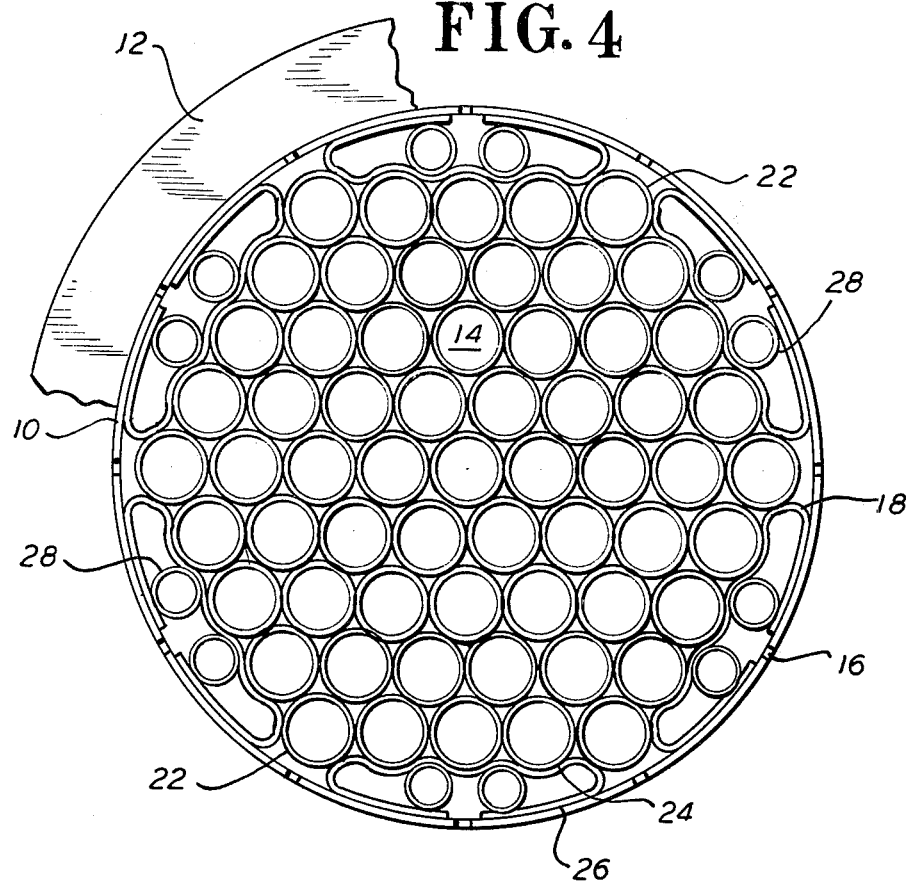
FIG. 4 is a plan view of a preferred embodiment of the invention.

The prior art device, shown in FIG. 7, had very little capability for expansion. The filter element 30, which may be generally described as a corrugated spiral, had unpredictable expansion characteristics and was difficult to fabricate. The placement of the filter element 30 at the flanged end of the housing 32 placed a severe restriction on expansion. As a result, high temperatures caused the filter element 30 to bow out of its normal plane, and in a fluctuating temperature situation the filter element 30 would soon crack and fail. On the contrary, the filter of the present invention will allow substantial unrestricted expansion in the plane of the filter element, thus eliminating the buckling problem.

Those skilled in the art will recognize numerous variations and alterations of this invention from the drawings and the description given above. Accordingly, it is the intent of the applicant that the drawings and specification should be interpreted as being illustrative and not as limiting the scope of this invention as claimed hereinbelow.

I claim:

1. An exhaust gas filter for oil and gas well pump engines, wherein the filter is subjected to high, fluctuating temperatures comprising a housing having two open ends, mounting means at one end to enable the housing to be mounted in an exhaust line to permit flow of exhaust gas through the housing, and a multiplicity of longitudinal slits in the wall of said housing at the opposite end; a filter element composed of a material which expands or contracts with temperature change, positioned in the housing near the end having slits; and a plurality of resilient brackets supporting the filter element in the housing, positioned between the filter element and the inside wall of the housing, each of said brackets being formed into an elongated loop generally conforming to the contour of the filter element and the housing.

2. A filter as defined in claim 1, wherein the brackets are formed into open elongated loops, and each bracket is positioned in the housing so that the open portion thereof aligns with a slit.

3. A filter as defined in claim 1 wherein the filter element comprises a hexagonally stacked array of open ended tubes positioned in said housing to permit flow of exhaust gas therethrough, with said brackets being positioned along the sides of the hexagon formed by the array.

4. A filter as defined in claim 1 wherein the filter element comprises a hexagonally stacked array of open ended tubes positioned in said housing to permit flow of exhaust gas therethrough, with said brackets being positioned at the apexes of the hexagon formed by the array.

5. A filter as defined in claim 1, wherein the filter element comprises a stacked array of open ended tubes positioned in said housing to permit flow of exhaust gas therethrough said tubes, the brackets and the portions of the housing between the slits being brazed together to form a unitary structure.

6. A filter for removing foreign matter from a high temperature gas flowing through a conduit, comprising a housing having an inlet end and an outlet end, slits in the wall of the outlet end thereof and having means thereon at the inlet end for mounting the same in a conduit to permit a gas to pass through the housing; a hexagonal stacked array of open ended tubes composed of a material which expands or contracts with temperature change, forming a filter element located within the end of the housing having slits; a plurality of resilient brackets, each forming an open elongated loop between the filter element and the housing and supporting the filter element in the housing, in a manner to permit flow of the gas through the filter element and the brackets, with the open portion of each bracket being positioned to align with a slit in the housing, so that the filter element will be free to expand and contract with temperature variation in the gas flowing through the filter.

* * * * *